United States Patent [19]
Becker et al.

[11] 3,873,546
[45] Mar. 25, 1975

[54] CATALYTIC REDUCTION OF 4-METHYL-β,β-DIPHENYL-1-PIPERAZINE ETHANOL

[75] Inventors: Frank Carl Becker, Gurnee; Frederik Hendrik Van Munster, Waukegan, both of Ill.

[73] Assignee: Abbott Laboratories, North Chicago, Ill.

[22] Filed: Feb. 6, 1974

[21] Appl. No.: 440,117

[52] U.S. Cl. .............................. 260/268 R, 424/250
[51] Int. Cl. ............................................ C07d 51/70
[58] Field of Search ............................... 260/268 R

[56] References Cited
OTHER PUBLICATIONS

H. E. Zaugg et al., J. Am. Chem. Soc., Vol. 80, 2,763–68, (1958).

H. E. Zaugg et al., J. Am. Chem. Soc., Vol. 80, (1958).

Morris Freifelder, J. Org. Chem., Vol. 29, (4), pp. 979–980, (1964).

*Primary Examiner*—Donald G. Daus
*Assistant Examiner*—Jose Tovar
*Attorney, Agent, or Firm*—Paul D. Burgauer; Robert L. Niblack

[57] ABSTRACT

A catalytic reduction is described for converting N-(2,2-diphenyl-2-hydroxyethyl)-N'-methylpiperazine to N-(2-phenyl-2-cyclohexyl-2-hydroxyethyl)-N'-methylpiperazine, producing better yields and easier recovery of the desired end product than known before.

3 Claims, No Drawings

CATALYTIC REDUCTION OF 4-METHYL-ββ-DIPHENYL-1-PIPERAZINE ETHANOL

DETAILED DESCRIPTION OF THE INVENTION

One of the compounds described in U.S. Pat. No. 2,980,683, the N-(2-phenyl-2-cyclohexyl-2-hydroxyethyl)-N'-methylpiperazine of formula I

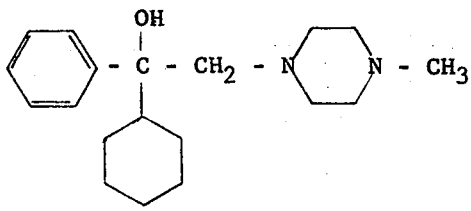

has been used widely as a precursor for antispasmodic and antiParkinsonian drugs. According to the above patent, the desired compound is made from the N-(2,2-diphenyl-2-hydroxyethyl)-N'-methylpiperazine of formula II

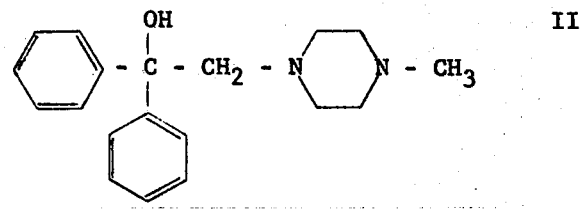

by catalytic reduction in an acidic aqueous medium in the presence of platinum oxide. In order to make a highly active drug, the above compound of formula I is quaternized which requires isolation and purification thereof.

The known process requires the hydrogenation mixture containing the compound of formula I to be treated in an aqueous solution with caustic, followed by extraction with toluene. The toluene solution requires to be distilled in order to obtain the base of the active compound and the latter to be dissolved in isopropanol and quaternized with dimethyl sulfate. In brief, the prior art process requires that the hydrogenated material resulting from the catalytic reduction be transferred into another solvent before the quaternization can take place while simultaneously purifying the desired base from other hydrogenation products and by-products.

It is therefore an object of the present invention to minimize the steps required to obtain a product solution containing the precursor of formula I useful for making a pharmaceutically active material. It is a particular object of this invention to provide a process for making the compound of formula I that does not require the transfer thereof from the aqueous hydrogenation solvent into an organic solvent that is suitable for quaternization of the compound of formula I. It is another object of this invention to produce the compound of formula I from the compound of formula II in good yield. It is a further object of this invention to produce the compound of formula I from the compound of formula II by a catalytic reduction of which the catalyst can be reused numerous times.

These and other objects are accomplished by hydrogenating the compound of formula II in anhydrous isopropanol in the presence of rhodium. This procedure has the following advantages that are not available by using older methods: the catalyst can be reused numerous times and, if it should become exhausted, its activity can easily be regenerated; the filtrate obtained following catalyst filtration can directly be used as the reaction solution for the quaternization step required to make pharmaceutically active compounds; the hydrogenation process can be carried out under low pressure conditions requiring no special equipment; and the hydrogenation product solution does not require extensive purification as it contains no or only negligible amounts of by-products.

Since the above process can be carried out under low pressure conditions, it is suitably used in standard laboratory equipment such as a Parr shaker, an ordinary still or a round flask. Hydrogen pressure of below 100 psig are suitable and, in a preferred embodiment for a laboratory scale, pressures of below 75 psig are used. The temperature of the reaction mixture is preferably raised to a level of 45°–70°C. in order to accelerate the reaction without causing undue side reactions. However, temperatures of 25° to 85° are suitable but at the lower range, the reaction may be too slow for commercial needs. The upper limit assures that essentially no over-hydrogenation takes place.

The catalyst is preferably supported by one of the usual carriers for rhodium, e.g., alumina, silica gel, bentonite or the like. Rhodium sponge or any other finely divided form of the metal is acceptable. Commerically, catalyst containing 2 ½, 5 or 10% rhodium on a support can be obtained and any of these will produce the desired result. Catalyst amounts calculated on the basis of rhodium metal in a range of 1–5% of the amount of the compound of formula II will catalyze the reaction sufficiently to complete uptake of the calculated amount of hydrogen within 60–10 hours.

While the above reaction can be carried out with isopropanol solutions containing between 5 and 40% by weight of the compound of formula II, the process of this invention is preferably carried out with concentrations of 15 – 25% by weight of said compound in said alcohol. At concentrations below 15%, crystallization of the quaternized compound made in situ from the compound of formula I may be incomplete without an additional concentrating step; at solution concentrations above 25%, the hydrogenation filtrate may require further dilution in order to assure that the precipitating quaternized salt does not entrap other particles present in the quaternization solution.

The surprising fact of the present process is that the hydrogenation of the compound of formula II to the desired compound of formula I can be carried out in the absence of water. By using anhydrous isopropanol as the reaction medium, the resulting hydrogenation mixture can simply be filtered free of the catalyst and the filtrate is used without further work-up for the subsequent quaternization reaction which is required to make the nontoxic, quaternary ammonium salts described in U.S. Pat. No. 2,907,765. The filtered catalyst can be replaced in the reaction vessel and reused again and again for subsequent batches of the same reaction.

No appreciable reduction in catalyst activity could be discovered in six reuses of the catalyst.

The hydrogenation of the present invention can very easily be stooped at the desired stage since the hydrogenation rate for the second phenyl ring of the compound of formula II is vastly slower under the above conditions. Thus, the hydrogen supply is disrupted when the hydrogen absorption rate decreases sharply, i.e., at the time when about three molar equivalents of hydrogen have been absorbed. Best results in view of the subsequent quaternization reaction are obtained when the hydrogenation reaction is interrupted when between 2.97 and 3.3 molar hydrogen equivalents are absorbed.

In a simple embodiment of the present invention, the appropriate amount of rhodium supported by alumina is placed in a solution of the compound of formula II in anhydrous isopropanol and after purging the air in the hydrogenation vessel first with nitrogen and replacing the nitrogen with hydrogen, the vessel is closed and hydrogen is supplied to the reaction vessel at a pressure of 60 psig. Agitation or shaking of the reaction mixture with or without external cooling or heating will show hydrogen absorption and, whenever the hydrogen pressure drops to a level of below 20 psig in the reaction vessel, it is built up again by a fresh supply of hydrogen. The reaction is interrupted when the theoretical amount of hydrogen has been taken up whereupon the reaction mixture is filtered and the filtrate is directly used for the preparation of the quaternized antispasmodic drugs to which the process of this invention is essentially directed.

In order to illustrate the method of the present invention, reference is made to the following examples which, however, is not intended to limit the invention in any respect.

EXAMPLE

A 1900 liter stainless steel hydrogenator was charged with 180.5 kg. of the compound of formula II, 99.5 kg. of 2 ½% rhodium on alumina and 643 kg. of anhydrous isopropanol. The vessel was evacuated and the remaining air flushed out with hydrogen. The hydrogenation was started by pressurizing the vessel with hydrogen at 38 psig (2.6 atm.) gradually raising the temperature in the reactor. Hydrogenation rate was high in the beginning but slowly decreased as the reaction proceeded. The temperature was allowed to increase to 65° C. to keep a reasonable rate of hydrogen uptake. When the theoretical amount of hydrogenation (1,560 ft.$^3$ or 55 × 10$^3$ liters) was consumed after eight to nine hours, the hydrogenation was terminated by cooling the contents and replacing the hydrogen in the vessel with nitrogen. Analysis of the contents showed that only 1% of the compound of formula II had remained and that 92.1% of the compound of formula I was present, with 6.9% of a mixture of by-products. The reactions mixture was filtered and the filtrate was converted to the corresponding quaternized compound by the direct addition of dimethyl sulfate according to the method described in Example 2 of U.S. Pat. No. 2,980,683.

In an alternate work-up for the filtrate obtained above, the solution containing 404.75 kg. of N-(2-phenyl-2-cyclohexyl-2-hydroxyethyl)-N'-methylpiperazine as a 24.3 weight % solution in isopropanol was reacted with 174.41 kg. of dimethylsulfate by adding the latter slowly under agitation. After completion of the addition, analysis showed that the solution still contained 130 mg./ml. of the unreacted base of formual I. An additional 9.1 kg. of dimethylsulfate was added. The desired quaternized piperazonium compound precipitated was centrifuged and dried, representing 483.8 kg. of N-(2-cyclohexyl-2-phenyl-2-hydroxyethyl)-N'-methylpiperazine methylsulfate. Based on the starting material of formula I, this represented a yield of 80% of theory.

What is claimed is:

1. The process of preparing a solution of N-(2-cyclohexyl-2-phenyl-2-hydroxyethyl)-N'-piperazine which is directly quaternizable, consisting essentially in hydrogenating a solution of N-(2,2-diphenyl-2-hydroxyethyl)-N'-methylpiperazine in anhydrous isopropanol in the presence of 1–5% by weight of finely divided rhodium based on said N-(2,2-dipehnyl-2-hydroxyethyl)-N'-methylpiperazine at a temperature of between room temperature and 85° C. at a hydrogen pressure of between 20 and 100 psi until 2.97 –3.3 molar equivalents of hydrogen are absorbed and removing the catalyst from said mixture.

2. The process of claim 1 wherein said N-(2,2-diphenyl-2-hydroxyethyl)-N'-methylpiperazine is present in said isopropanol at a concentration of between 15 to 25% by weight.

3. The process of claim 1 wherein said hydrogenation is carried out at a temperature of between 45° and 70° C.

* * * * *